May 3, 1966     W. BORBERG     3,249,274
TWO CLAW INTERMITTENT

Filed March 4, 1964     4 Sheets-Sheet 1

INVENTOR.
WILLY BORBERG

BY *H. S. Mackey*

ATTORNEY.

INVENTOR.
WILLY BORBERG

BY *H. A. Mackey*

ATTORNEY.

United States Patent Office 3,249,274
Patented May 3, 1966

3,249,274
TWO CLAW INTERMITTENT
Willy Borberg, Briarcliff Manor, N.Y., assignor to General Precision, Inc., a corporation of Delaware
Filed Mar. 4, 1964, Ser. No. 349,341
3 Claims. (Cl. 226—63)

This invention relates generally to motion picture apparatus and particularly to a novel intermittent movement capable of operating at unusually high frame rates.

The present invention is directed to the problem of photographing and displaying a series of images occurring at rates of from 100 to 300 images per second. Such rates are far in excess of the 20 to 30 frames per second usually found in the normal motion picture apparatus. The usual intermittent mechanism comprises a pin and star wheel arrangement which drives a sprocket intermittently to pull down the film. However, when it is attempted to apply such techniques to a system requiring 100 to 300 frames per second it is found that the inertia of the intermittently moving parts presents serious problems.

It is a general object of the present invention to provide an improved intermittent mechanism.

Another object is to provide an intermittent movement for high-speed operation.

Another object is to provide an intermittent movement capable of pulling down a film at rates on the order of 100 to 300 frames per second.

Briefly stated, the invention uses two claws operated by separate crank arms on a common shaft. The crank arms are displaced 180° from each other so that as one claw moves down the other moves up. The claws engage the sprocket holes of the film alternately, each pulling the film on its down stroke. At the upper limit of travel, the claw enters a sprocket hole with a predetermined amount of clearance and engages the film only after the clearance has been taken up by the first portion of the descent of the claw. The time required to take up the clearance constitutes the dwell time during which the film remains stationary and is exposed or the image projected. During the remaining portion of the descent of the claw, the film is pulled down. The cycle is then repeated by the other claw.

For a clearer understanding of the invention reference may be made to the following detailed description and the accompanying drawing, in which.

Figure 1:
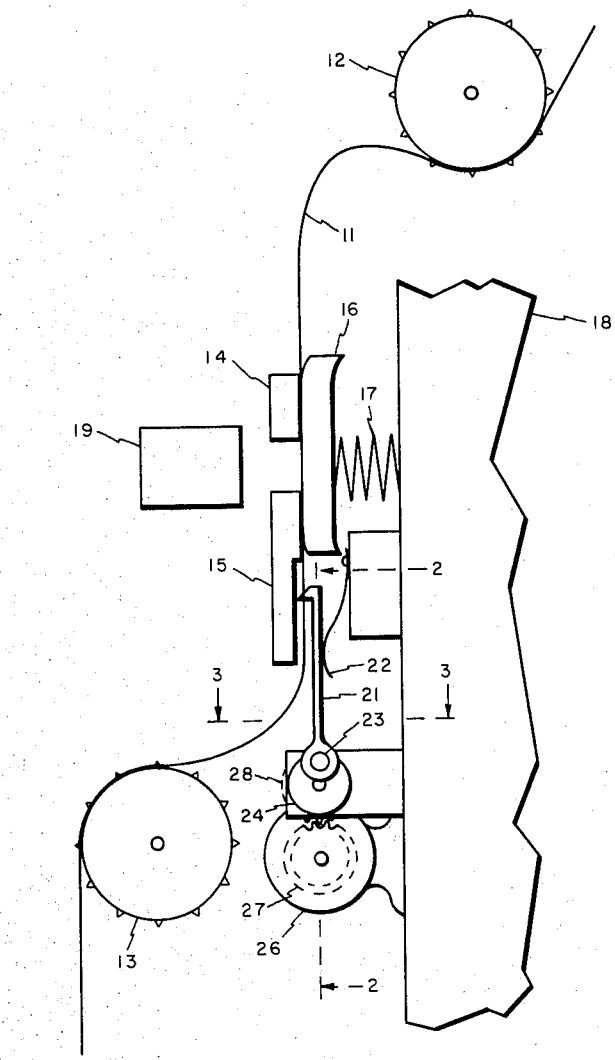
FIGURE 1 is an elevation view of apparatus incorporating the invention.

Referring first to FIGURE 1 there is shown an edge view of a film 11 which is provided with the usual sprocket holes (not visible in FIGURE 1) on each side of the film. A motor driven sprocket 12 draws the film from a supply reel after which it passes through a film gate to another motor driven sprocket 13 from whence it is wound on a take-up reel. The film gate comprises stationary plates 14 and 15 and a pressure plate 16 or pressure guide bars which holds the film flat against the gate by means of a spring 17 acting between the plate 16 and a frame member 18. There is shown schematically a lens 19 which, in the case of a camera, focusses the scene to be recorded on the film, or which, in the case of a projector, focusses the image on the screen.

Below the film gate are two claws one of which, the claw 21 is shown. Each claw comprises an upper prong portion and an elongated connecting rod portion. The claw portion cooperates with the sprocket holes as will be more fully explained. A leaf spring 22 urges the claw 21 into engagement with the film 11. The plate 15 is relieved at its lower end as shown in order to serve as a stop which limits the penetration of the prong portion of the claw 21 into the sprocket holes.

The lower end of the connecting rod portion of the claw 21 is journaled around a pin 23 which is eccentrically mounted on a disk or wheel 24 which in turn is rotated at a substantially constant speed thereby moving the claw 21 up and down.

Figure 2:
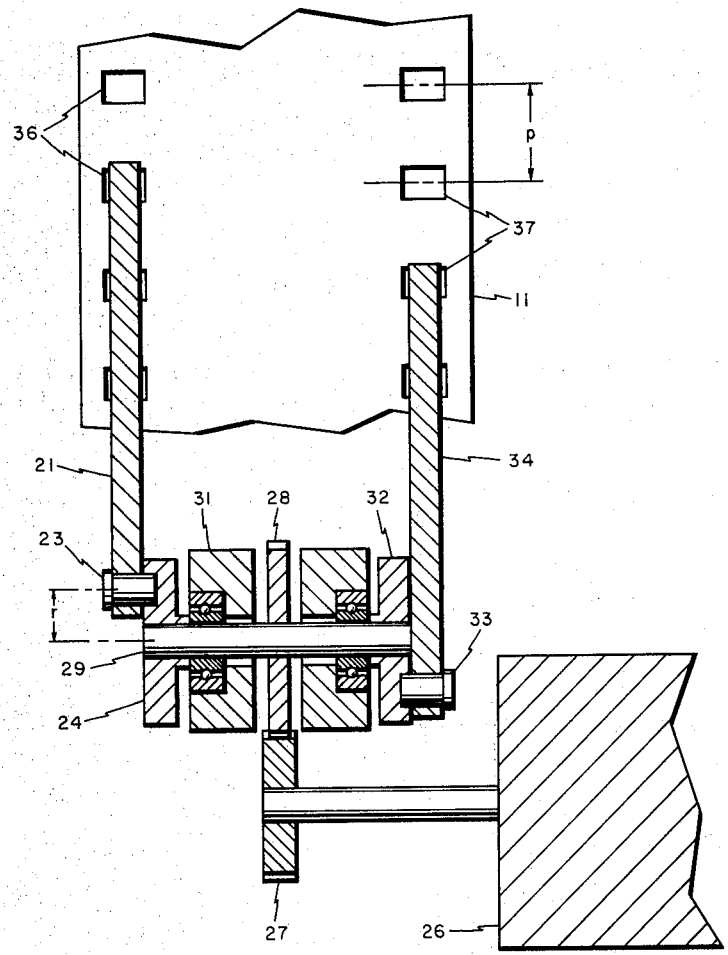
FIGURE 2 is a cross-section view taken on the plane 2—2 of FIGURE 1.

As best shown in FIGURE 2 a motor 26 drives a gear 27 which meshes with a gear 28 fastened to a shaft 29. The shaft 29 is journaled in a support 31. The disk 24 is fastened to one end of the shaft 29 and a similar disk 32 is fastened to the other end. The previously mentioned pin 23 is fastened to the disk 24 and another pin 33 is similarly fastened to the disk 32. The pins 23 and 33 are positioned in the disks 24 and 32 180° apart. The claws 21 and 34 are pivoted about the pins 23 and 33 respectively. As the shaft 29 rotates the claws 21 and 34 are reciprocated up and down out of phase with each other, that is, as one claw moves upward the other moves downward. The claw 21 cooperates with a series of sprocket holes 36 in the film 11 while the claw 34 cooperates with a similar series of holes 37 on the other side of the film 11. The sprocket holes are uniformly spaced, the center to center distance, or pitch, being designated $p$ in FIGURE 2.

Figure 3:
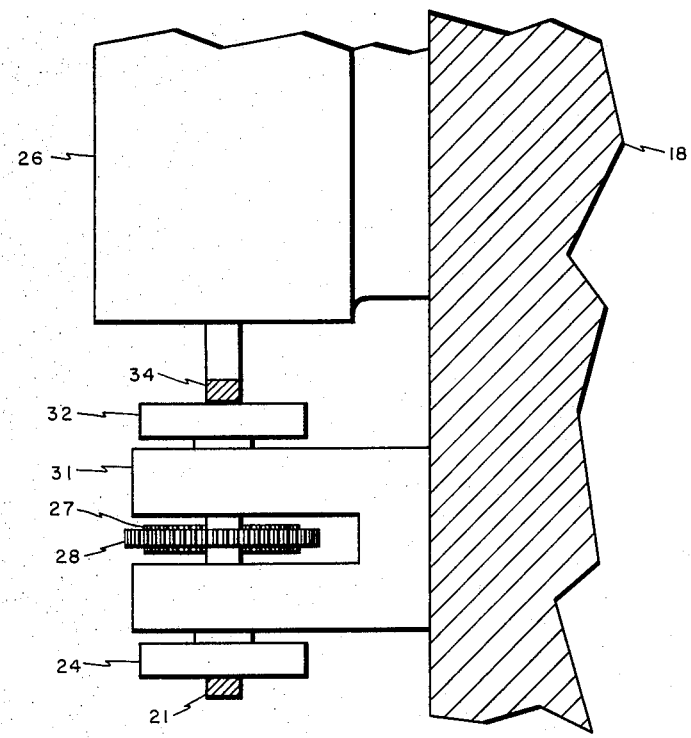
FIGURE 3 is a cross-section view taken on the plane 3—3 of FIGURE 1.

As best shown in FIGURE 3 the support 31 and the motor 26 are mounted on the frame member 18.

Figure 4:
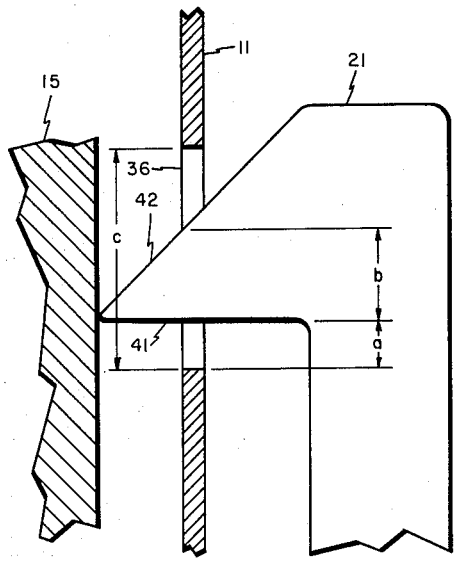
FIGURE 4 is an enlarged fragmentary view showing the relationship between one of the claws and the film.

Referring now to FIGURE 4 the claw 21 is shown at its upper limit of travel. The upper prong portion is formed with a flat surface 41 which, in operation, is substantially horizontal and perpendicular to the film 11. Accordingly, as the claw 21 moves downward it engages the lower edge of the perforation 36 and pulls the film down. The upper edge 42 of the prong portion is inclined so that when the other claw 34 is pulling film down the upper edge of the perforation 36 engages the inclined portion 42 thereby ejecting the claw 21 from the perforation.

The relative dimensions of the perforations and the prong portion of the claw are important. At the upper limit of travel of claw, the surface 41 extends above the lower edge of the perforation 36 by a distance $a$. This requires that the thickness $b$ of the claw in the region where it enters the perforation be less than the longitudinal dimension $c$ of the perforation 36 by at least the distance $a$. It is preferred that, as shown, there also be substantial clearance between the surface 42 and the upper edge of the perforation.

The clearance distance $a$ is obtained by making the radius of the crank arm ($r$ in FIGURE 2) greater than one half the pitch, or, what is the same thing, making the diameter greater than the pitch, by the distance $a$. Thus the excursion of the claw exceeds the pitch by the distance $a$. As the claw starts downward from the position shown in FIGURE 4 and travels through the distance $a$, the film remains stationary. This stationary period constitutes the dwell time during which the film is exposed or the image projected. After the distance $a$ has been taken up the film is pulled down.

Figure 5:
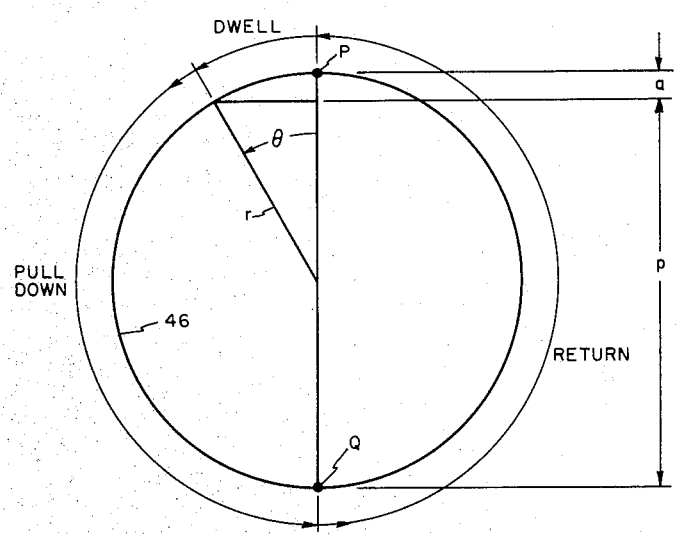
FIGURE 5 is a diagram useful in explaining the invention.

FIGURE 5 shows the cycle of operation diagramatically as the crank pin 23 travels around the circle 46. The point P represents the upper limit of travel of the crank pin 23 and the claw 21. As the pin travels through the angle $\theta$ the claw 21 descends through the distance $a$ without engaging the film. This is the dwell time. As the pin rotates further to the point Q the claw 21 engages the film 11 pulling it down a distance *p* equal to the pitch of the sprocket holes. Further rotation of the pin 23 causes the claw 21 to rise until the pin is again at the point P whereupon the cycle is repeated. As the claw 21 rises the claw 34 pulls the film down and as the film descends the claw 21 is ejected from the sprocket holes by the camming action of the surface 42 (FIGURE 4) against the urging of the spring 22 (FIGURE 1).

It is apparent that the present invention provides an intermittent mechanism eminently suitable for high speed operation. The pull down time occupies a large portion of the cycle in order to hold the velocity and acceleration of the moving parts to a minimum. Additionally, the only intermittently moving parts other than the film are the two claws 21 and 34 which can be made very light in weight.

Although a preferred embodiment of the invention has been described for illustrative purposes, many modifications will occur to those skilled in the art. It is therefore desired that the protection afforded by Letters Patent be limited only by the true scope of the appended claims.

What is claimed is:

1. In combination with a strip of film formed with a series of regularly spaced perforations, apparatus for advancing said film intermittently, comprising,
   a pair of claws positioned adjacent to said film for alternately engaging said film by entering said perforations,
   means resiliently urging each claw into engagement with said film in the region of said perforations whereby as said film advances said claws enter said perforations,
   stop means for limiting the penetration of said claws into said perforations,
   each claw being formed with a lower surface substantially perpendicular to said film for cooperation with the lower edges of said perforations and being formed with an inclined upper surface for cooperation with the upper edges of said perforations whereby downward movement of said claw causes said film to be drawn downward whereas downward movement of said film causes said claw to be ejected from said perforations,
   the thickness of each claw in the region where it enters said perforations being less than the longitudinal dimension of each perforation, and
   means for imparting reciprocating motion to said claws in 180° out-of-phase relationship in a direction substantially parallel to the length of said strip of film, with the linear excursion of such motion being greater than the pitch of said perforations thereby maintaining said film strip stationary during the time interval that said linear excursion exceeds said pitch.

2. In combination with a strip of film formed with first and second series of regularly spaced perforations, one series adjacent each edge of said film, apparatus for advancing said film intermittently, comprising,
   first and second claws for alternately engaging said film by entering said first and second series of perforations respectively, the thickness of each claw in the region where it enters a perforation being less than the longitudinal dimension of each perforation,
   said first and second claws being positioned adjacent to said film in the region of said first and second series of perforations respectively,
   means resiliently urging each claw into engagement with said film whereby as said film advances said claws enter said perforations, and
   means for imparting reciprocatory motion to said claws in 180° out-of-phase relationship, with the linear excursion of such motion being greater than the pitch of said perforations thereby maintaining said film stationary during the time interval that said linear excursion exceeds said pitch.

3. In combination with a film strip formed with a series of regularly spaced perforations, apparatus for advancing said film strip intermittently, comprising,
   first and second claws each comprising an elongated connecting rod portion and a prong portion projecting laterally from one end thereof,
   a shaft,
   means for rotating said shaft,
   first and second discs fastened to said shaft for rotation therewith,
   first and second crank pins fastened to said first and second discs respectively parallel to said shaft and displaced 180° with respect to each other,
   one of said crank pins being journaled in each of said connecting rod portions, whereby as said shaft rotates one claw moves up as the other moves down,
   said claws being positioned with the connecting rod portions adjacent and substantially parallel to the length of said film strip, and
   means resiliently urging each claw into engagement with said film in the region of said perforations whereby as said film advances said prongs enter said perforations,
   the distance of each crank pin from said shaft being greater than one half the pitch of said perforations, whereby the linear excursion of each prong exceeds said pitch,
   the thickness of each prong in the direction of film travel being less than the longitudinal dimension of each perforation, whereby as each prong moves in the direction of film travel said film remains stationary for the time interval during which a respective prong is advanced a distance equal to its excursion in excess of said pitch and is then advanced a distance equal to said pitch.

References Cited by the Examiner

UNITED STATES PATENTS

| 2,076,189 | 4/1937 | Wittel | 226—71 |
| 2,485,255 | 10/1949 | Broido | 226—67 |
| 3,049,275 | 8/1962 | Nuttall | 226—63 |

M. HENSON WOOD, JR., *Primary Examiner.*

R. A. SCHACHER, *Assistant Examiner.*